(12) United States Patent
Noguchi et al.

(10) Patent No.: US 9,740,613 B2
(45) Date of Patent: Aug. 22, 2017

(54) CACHE MEMORY SYSTEM AND PROCESSOR SYSTEM

(71) Applicant: KABUSHIKI KAISHA TOSHIBA, Tokyo (JP)

(72) Inventors: Hiroki Noguchi, Kanagawa (JP); Shinobu Fujita, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/069,409

(22) Filed: Mar. 14, 2016

(65) Prior Publication Data

US 2016/0196210 A1 Jul. 7, 2016

Related U.S. Application Data

(63) Continuation of application No. PCT/JP2014/074128, filed on Sep. 11, 2014.

(30) Foreign Application Priority Data

Sep. 20, 2013 (JP) .................................. 2013-196128

(51) Int. Cl.
*G06F 12/08* (2016.01)
*G06F 12/0811* (2016.01)
(Continued)

(52) U.S. Cl.
CPC .......... *G06F 12/0811* (2013.01); *G06F 12/08* (2013.01); *G06F 12/0897* (2013.01);
(Continued)

(58) Field of Classification Search
CPC .. G06F 12/0811; G06F 12/08; G06F 12/0897; G06F 12/1009
(Continued)

(56) References Cited

U.S. PATENT DOCUMENTS 5,440,707 A 8/1995 Hayes et al.
6,295,580 B1 9/2001 Sturges et al.
(Continued)

FOREIGN PATENT DOCUMENTS

JP 3-232034 10/1991
JP 2002-536715 10/2002
(Continued)

OTHER PUBLICATIONS

International Search Report from the Japanese Patent Office for International Application No. PCT/JP2014/074128, mailing date Nov. 11, 2014.

*Primary Examiner* — Stephen Elmore
(74) *Attorney, Agent, or Firm* — Finnegan, Henderson, Farabow, Garrett & Dunner, L.L.P.

(57) ABSTRACT

A cache memory system has a first cache memory comprising one or more levels, to store data corresponding to addresses, a second cache memory comprising a plurality of non-volatile memory cells, which has higher speed capability than a main memory, has a larger capacity than the first cache memory and stores data corresponding to addresses, and a first storage to store address conversion information from a virtual address issued by a processor to a physical address and to store flag information indicating whether data is stored in the second cache memory by a page having a larger data amount than a cache line, the first cache memory being accessed by the cache line.

18 Claims, 11 Drawing Sheets

(51) Int. Cl.
  *G06F 12/1009* (2016.01)
  *G06F 12/0897* (2016.01)
(52) U.S. Cl.
  CPC .. *G06F 12/1009* (2013.01); *G06F 2212/1016* (2013.01); *G06F 2212/283* (2013.01); *G06F 2212/65* (2013.01)
(58) Field of Classification Search
  USPC ....... 711/122, 144, 154, 156, 158, 168, 202, 711/208
  See application file for complete search history.

(56) References Cited

U.S. PATENT DOCUMENTS

| | | | |
|---|---|---|---|
| 6,442,666 B1 | 8/2002 | Stracovsky | |
| 6,532,528 B1 * | 3/2003 | Nishimoto | G06F 12/1027 711/200 |
| 6,654,855 B1 * | 11/2003 | Bopardikar | G06F 12/121 711/118 |
| 7,360,022 B2 * | 4/2008 | Tian | G06F 12/0848 710/22 |
| 9,460,018 B2 * | 10/2016 | DeBruyne | G06F 12/0875 |
| 2008/0114940 A1 | 5/2008 | Ito | |
| 2009/0006803 A1 | 1/2009 | Luick | |
| 2009/0292857 A1 | 11/2009 | Tanabe | |
| 2010/0100685 A1 | 4/2010 | Kurosawa et al. | |
| 2011/0231598 A1 * | 9/2011 | Hatsuda | G06F 12/0804 711/103 |
| 2011/0320762 A1 | 12/2011 | Soares et al. | |

FOREIGN PATENT DOCUMENTS

| | | |
|---|---|---|
| JP | 2002-536716 | 10/2002 |
| JP | 2002 536717 | 10/2002 |
| JP | 3370683 | 1/2003 |
| JP | 3473772 | 12/2003 |
| JP | 2009-9571 | 1/2009 |
| JP | 2009-282920 | 12/2009 |
| JP | 2010-97558 | 4/2010 |
| JP | 5129023 | 1/2013 |
| JP | 2013-529815 | 7/2013 |
| WO | WO-2006/038258 | 4/2006 |

* cited by examiner

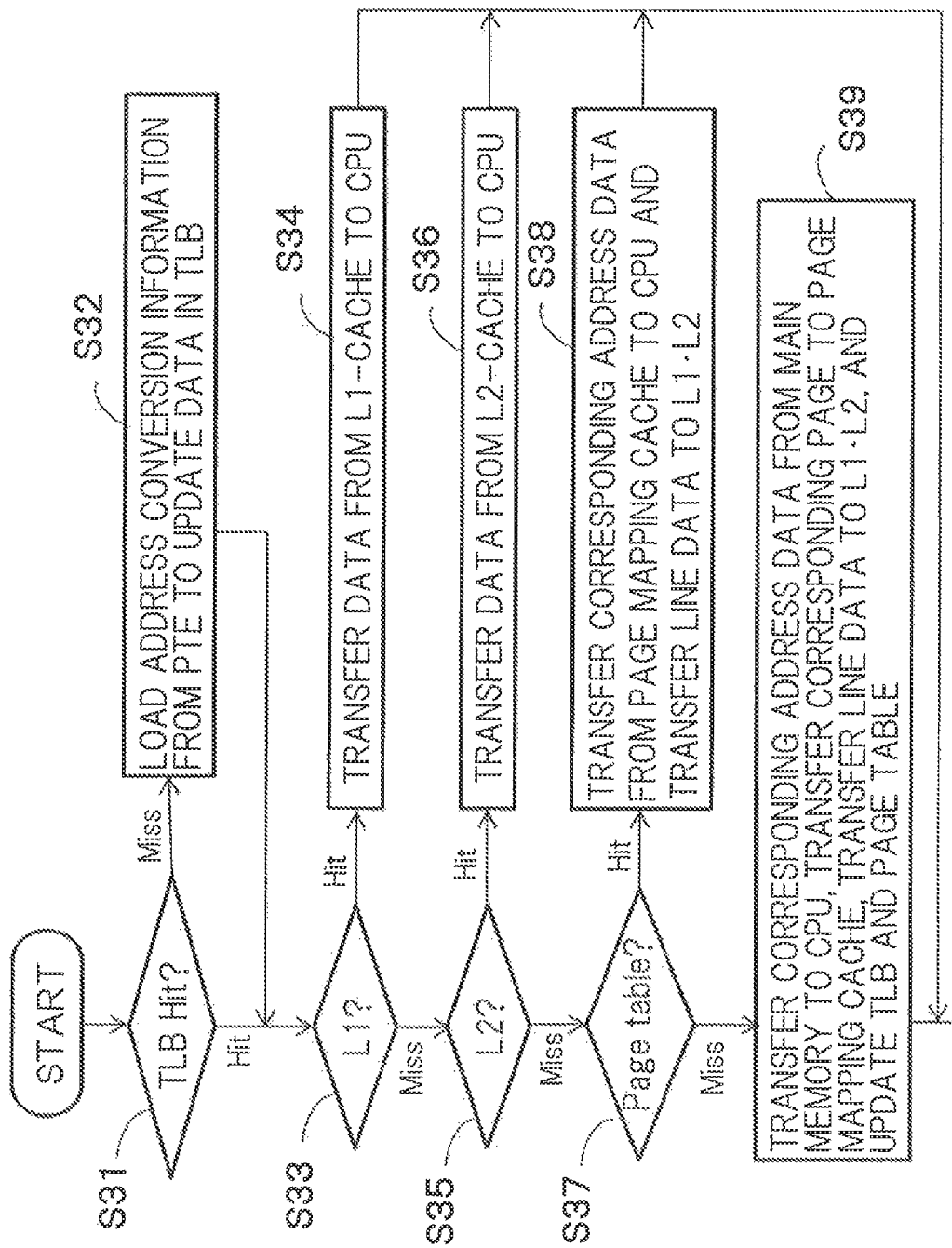
F I G. 12

CACHE MEMORY SYSTEM AND PROCESSOR SYSTEM

CROSS REFERENCE TO RELATED APPLICATIONS

This application is based upon and claims the benefit of priority from the prior Japanese Patent Application No. 2013-196128, filed on Sep. 20, 2013, the entire contents of which are incorporated herein by reference.

FIELD

Embodiments of the present invention relate to a cache memory system using non-volatile memories and a processor system.

BACKGROUND

Cache memories are accessible at higher speeds than main memories, which directly affect processor processing capability. Thus, the cache memories are expected to have larger capacities.

When a cache memory has a larger capacity, tag information for managing data in the cache memory becomes larger. Thus, it takes time to perform a determination process to determine whether data for which a processor has issued a read request exists in the cache memory. When it takes time to perform this determination process, it also takes time to access a main memory, which leads to the decrease in processor processing capability.

BRIEF DESCRIPTION OF THE DRAWINGS

FIG. 12 is a flowchart showing a process in the case where the CPU 2 issues a read request address, according to the third embodiment;

DETAILED DESCRIPTION

A cache memory system according to one embodiment has a first cache memory comprising one or more level, to store data corresponding to addresses, a second cache memory comprising a plurality of non-volatile memory cells, which has higher speed capability than a main memory, has a larger capacity than the first cache memory and stores data corresponding to addresses, and a first storage to store address conversion information from a virtual address issued by a processor to a physical address and to store flag information indicating whether data is stored in the second cache memory by a page having a larger data amount than a cache line, the first cache memory being accessed by the cache line.

Embodiments will now be explained with reference to the accompanying drawings.

First Embodiment

Figure 1:
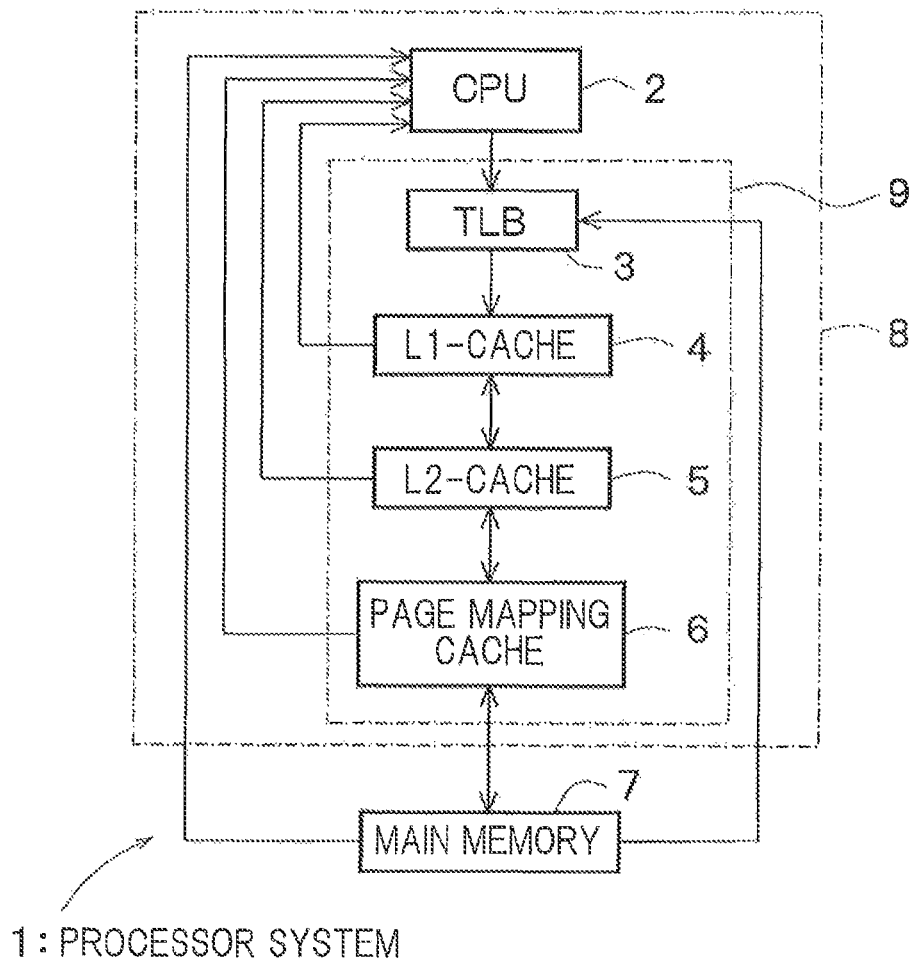
FIG. 1 is a block diagram showing schematic configuration of a processor system 1 according to a first embodiment of the present invention.

FIG. 1 is a block diagram showing schematic configuration of a processor system 1 according to a first embodiment of the present invention. The processor system 1 of FIG. 1 has a processor (CPU) 2, a translation lookaside buffer (TLB or first storage) 3, a first-level cache memory (L1-cache) 4, a second-level cache memory (L2-cache) 5, a large capacity memory (page mapping cache) 6, and a main memory 7.

The processor 2, the TLB 3, the L1-cache 4, the L2-cache 5 and the page mapping cache 6, other than the main memory 7, are integrated into one chip 8, for example. The TLB 3, the L1-cache 4, the L2-cache 5 and the page mapping cache 6 correspond to a memory system 9.

The L1-cache 4 and the L2-cache 5 each include a semiconductor memory (such as an SRAM) accessible at a higher speed than the main memory 7. The page mapping cache 6 includes a non-volatile memory (such as an MRAM) that is accessible at a higher speed than the main memory 7 and has a larger memory capacity than the L1-cache 4 and the L2-cache 5. In this specification, a lower-power-consuming spin transfer torque MRAM (STT-MRAM) will be explained as an example of the page mapping cache 6. The L1-cache 4 and the L2-cache 5 correspond to a first cache memory, the page mapping cache 6 corresponds to a second cache memory. The first cache memory may contain a high-level cache memory having a lower access priority than the L2-cache 5. The high-level cache memory is, for example, a L3-cache.

The TLB 3 stores address conversion Information for a virtual address issued by CPU 2 to be converted into a physical address, and flag information recording whether data is stored in the page mapping cache 6 for each page having a larger data amount than one cache line being an access unit of a k(k being an integer of 1 to n that is an integer of 1 or more)-th-level cache memory. The k-th-level cache memory corresponds to the first cache memory having one or more level. The TLB 3 in the present embodiment is a high-speed memory (such as an SRAM) because it is accessed by the CPU 2 at a higher priority than the L1-cache 4 and the L2-cache 5.

The main memory 7 has the largest memory capacity in all memories of the memory system 9. For this reason, the main memory 7 is, for example, a DRAM disposed outside the chip 8, or stacked thereon or thereunder by a package stacking technique.

Figure 2:
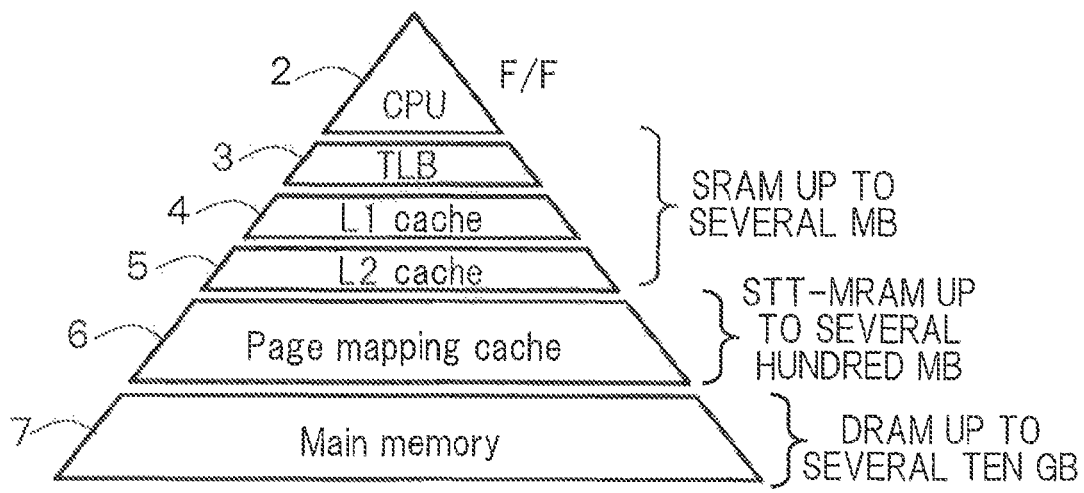
FIG. 2 is a diagram showing the access priority to a TLB 3, cache memories 4 to 6, and a main memory 7, in the first embodiment.

FIG. 2 is a diagram showing the access priority to the TLB 3, the cache memories 4 to 6, and the main memory 7, in the first embodiment. As shown, the CPU 2 accesses the TLB 3, the L1-cache 4, the L2-cache 5, the page mapping cache 6, and the main memory 7, in this order. Data in a frequently accessed memory is also stored in an infrequently accessed memory. Specifically, data in the L1-cache 4 is also stored in the L2-cache 5. Data in the L2-cache 5 is also stored in the page mapping cache 6. Data in the page mapping cache 6 is also stored in the main memory 7. In this way, the memories 4 to 7 maintain a hierarchical relationship. The address conversion Information and the like for accessing these memories are stored in the TLB 3.

FIG. 2 shows an example in which the CPU 2 includes flip-flops (F/Fs) or the like having MOS transistors, the TLB 3, the L1-cache 4 and the L2-cache 5 include SRAMs, the page mapping cache 6 includes STT-MRAMs, and the main memory 7 includes DRAMs.

Figure 3:
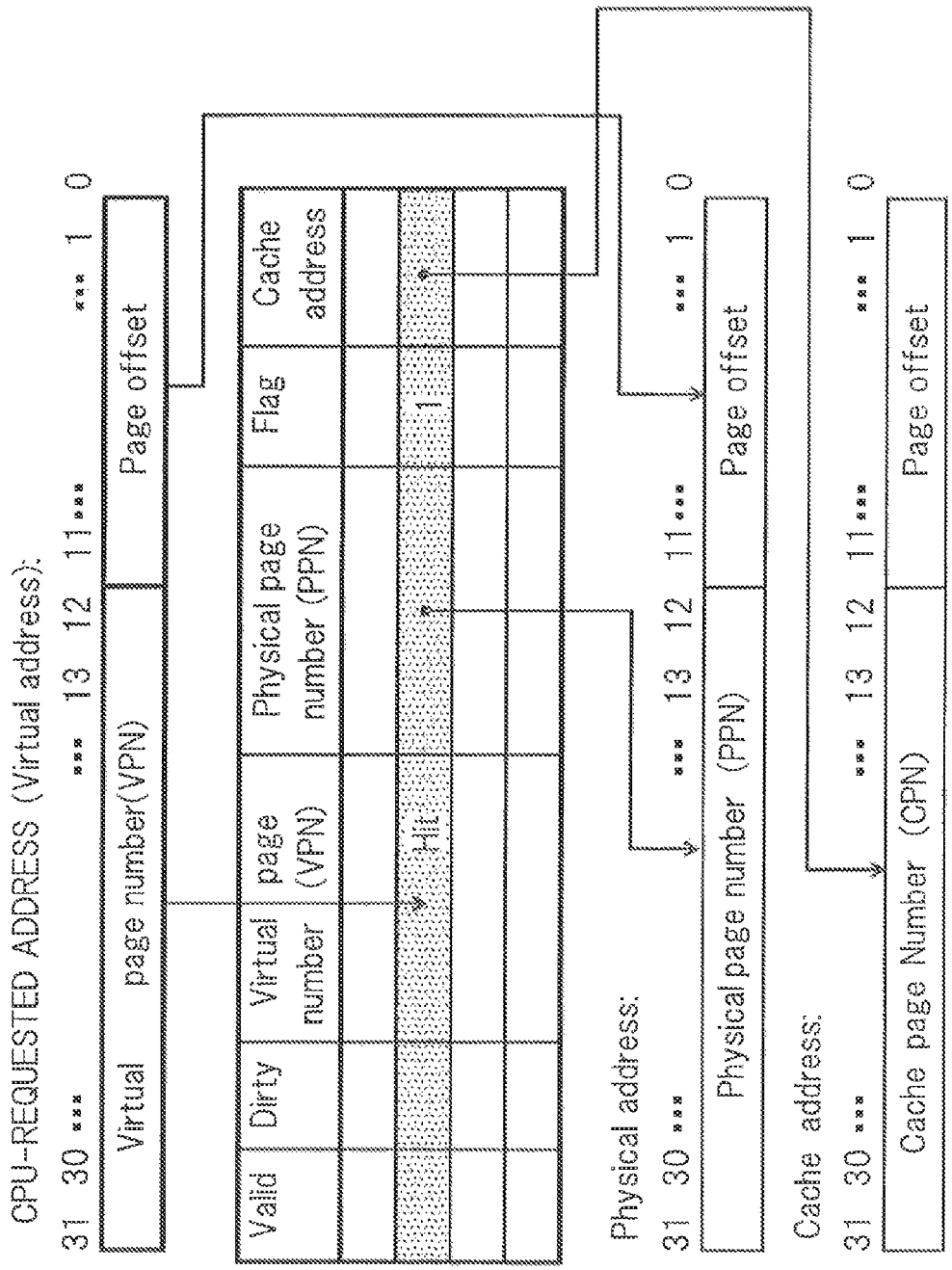
FIG. 3 is a diagram showing the internal configuration of the TLB 3 in the first embodiment.

FIG. 3 is a diagram showing the internal configuration of the TLB 3 in the first embodiment. The TLB 3 of FIG. 3 stores, per page, Valid information, Dirty information, virtual address information (VPN: Virtual Page Number), physical address information (PPN: Physical Page Number), flag information (Flag), and cache address information (CPN: Cache Page Number).

The addresses for each of which the CPU 2 makes a read request are virtual addresses. Each virtual address includes, as shown in FIG. 3, virtual address information VPN and page offset. The TLB 3 converts a virtual address from the CPU 2 into a physical address. The converted physical address includes, as shown in FIG. 3, physical address information PPN and page offset. The page offset in the physical address is the same as the page offset in the virtual address requested by the CPU 2.

The TLB 3 stores, as shown in FIG. 3, cache address information. Using the cache address information, the TLB 3 accesses the page mapping cache 6. The cache address information has, as shown in FIG. 3, a cache page number CPN and page offset. The page offset in the cache address is the same as the page offset in the virtual address requested by the CPU 2.

When the TLB 3 contains cache address information as shown in FIG. 3, the page mapping cache 6 is accessible with the cache address information, so that accessing efficiency is improved. However, as the memory capacity (the number of page entries) of the page mapping cache 6 increases, the amount of cache address information to be stored in the TLB 3 increases. This results in a larger capacity of the TLB 3, with a longer search time. For this reason, when the page mapping cache 6 has a large capacity, the cache address information may be deleted from the TLB 3 to decrease the information amount of the TLB 3. Nevertheless, since in this case, access to the page mapping cache 6 requires a physical address in the TLB 3, it takes more time to access the page mapping cache 6 than in the case where the cache address information is contained in the TLB 3.

When the task (process) of an operating system (OS) executed by the CPU 2 is changed, it is required to rewrite (flush) the Information of the TLB 3. This is because, the correspondence relationship between the virtual address and the physical address is different for each task, and namely, the same virtual address corresponds to different physical addresses. For this reason, when the task is changed, it is required to invalidate all page entries of the TLB 3. This is not a big problem when the size of the TLB 3 is small. However, when the size of the TLB 3 is large, it takes time to update the TLB 3, which causes process delays to the CPU 2. In order to solve such a problem of process delays, by providing an address space ID (ASID) that identifies the virtual space of each task and by storing, in advance in the TLB 3, page information for each address space ID, it is not required to flush the TLB 3 anytime the task is changed.

When the capacity of the page mapping cache 6 increases, the number of entries to the TLB 3 also increases, which causes search delays in the TLB 3. Thus, when there are many entries to the TLB 3, it is preferable for the TLB 3 to adopt a hierarchical structure or a set associative configuration with indexes each including part of bits (for example, lower 10 bits) of the virtual address information VPN, thereby reducing the search delays in the TLB 3.

Figure 4:
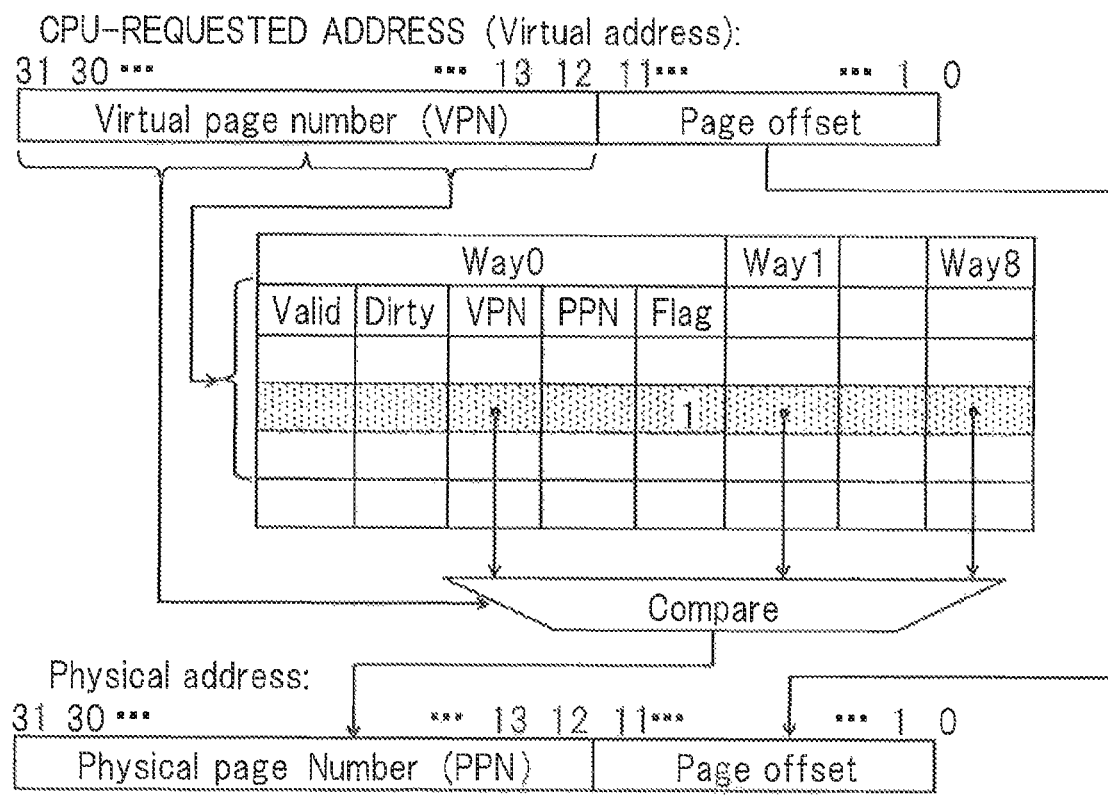
FIG. 4 is a diagram showing the Internal configuration of a set associative TLB 3.

FIG. 4 is a diagram showing the Internal configuration of a set associative TLB 3. The TLB 3 of FIG. 4 has a plurality of ways each with indexes each including part of bits of the virtual address information VPN. Part of bits (for example, lower 10 bits) of the virtual address information VPN used in each index of the set associative are identical in the same set. However, the remaining bits of the virtual address information VPN are different for each way. For this reason, all physical address information PPN output by the TLB 3 are different from each other.

In the TLB 3 of FIG. 4, a set in the TLB 3 is selected using part of a virtual address for which the CPU 2 has made a read request. In the case where the remaining part of the virtual address matches the virtual address information VPN held in each way in the selected set, the TLB 3 outputs the corresponding physical address information PPN.

Figure 5:
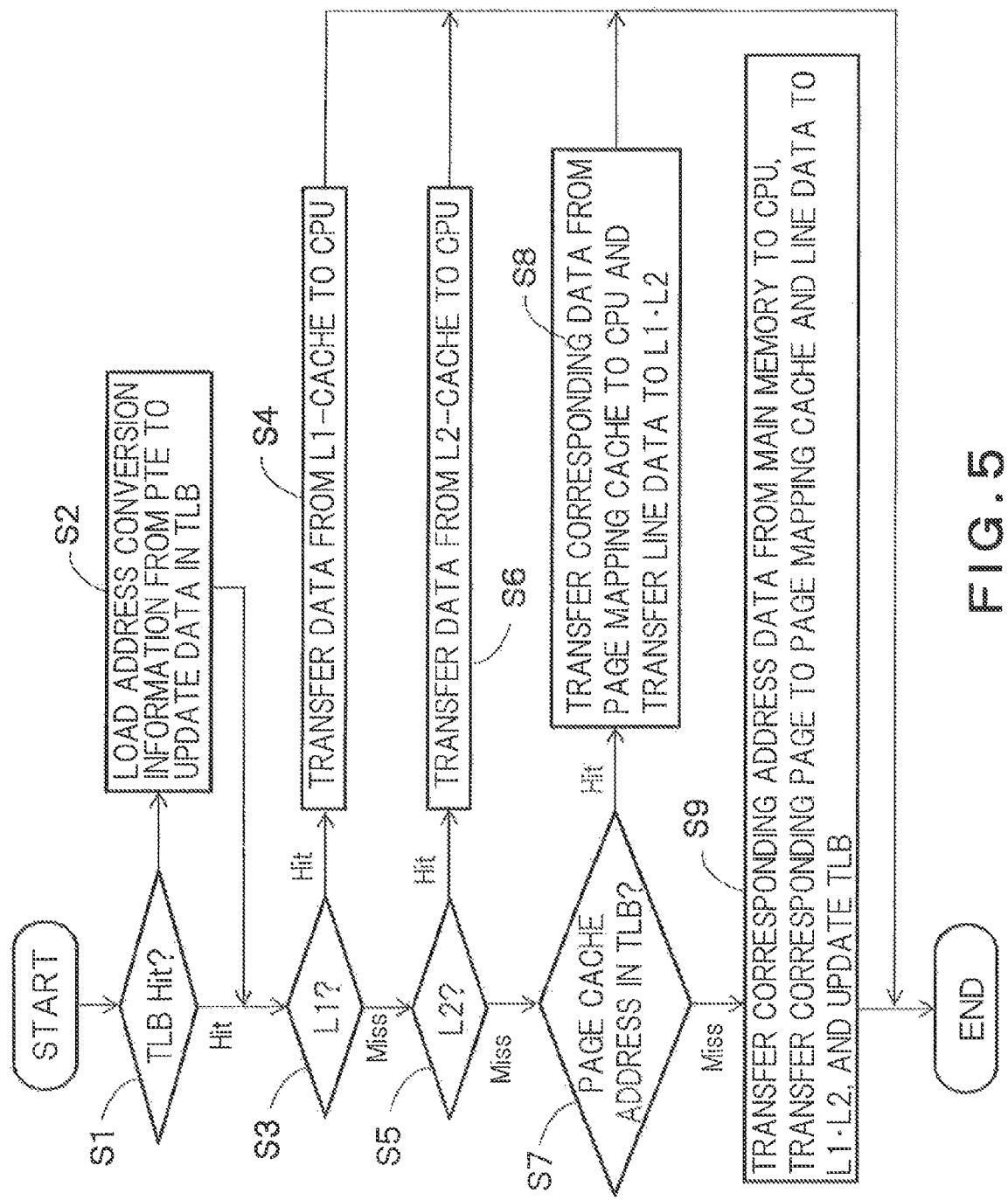
FIG. 5 is a flowchart showing a process in the case where a CPU 2 issues a read request address, according to the first embodiment.

FIG. 5 is a flowchart showing a process in the case where the CPU 2 issues a read request address, according to the first embodiment. Firstly, it is determined whether the read request address issued by the CPU 2 has any hits in the virtual address information VPN in the TLB 3 (step S1). If there are no hits, address conversion information is loaded from a page table entry (PTE) (not shown) in the main memory 7 to update the information in the TLB 3 (step S2). Steps S1 and S2 correspond to a first process.

If it is determined in step S1 that there is a hit or if step S2 is completed, it is determined whether the read request address issued by the CPU 2 has any hits in tag information in the L1-cache 4 (step S3). If there is a hit, the corresponding data stored in the L1-cache 4 is read out and transferred to the CPU 2, and the process of FIG. 5 ends (step S4). When indexes in the L1-cache 4 are made up of addresses in pages, it is possible to speculatively access a tag memory of the L1-cache 4, simultaneously with the first process. However, the determination of whether there are any hits has to be done after the completion of the first process.

If determined that there are no hits in step S3, it is determined whether the read request address issued by the CPU 2 has any hits in tag information in the L2-cache 5 (step S5). If there is a hit, data stored in the L2-cache 5 is read out and transferred to the CPU 2, and the process of FIG. 5 ends (step S6). Steps S3 to S6 correspond to a second process.

If determined that there are no hits in step S5, it is determined, based on flag information held by the TLB 3, whether the data corresponding to the read request address issued by the CPU 2 is stored in the page mapping cache 6 (step S7). If stored, page data corresponding to the read request address is read out from the page mapping cache 6 and transferred to the CPU 2, and cache line data corresponding to the read request address is transferred to the L1-cache 4 and the L2-cache 5 (step S8). Steps S7 and S8 correspond to a third process.

If determined that no corresponding data is stored in step S7, the data corresponding to the read request address issued by the CPU 2 is read out from the main memory 7 and transferred to the CPU 2, page data corresponding to the read request address is transferred to the page mapping cache 6, cache line data corresponding to the read request address is transferred to the L1-cache 4 and the L2-cache 5, and the TLB 3 is updated (step S9). Step S9 corresponds to a fourth process.

As described above, in the first embodiment, the page mapping cache 6, which has a larger capacity than the L1-cache 4 and the L2-cache 5 and is accessible at a higher speed than the main memory 7, is provided so that the tag information of the page mapping cache 6 is stored in the known TLB 3 per page. By storing the tag information in the TLB 3 per page, the amount of information can be reduced more than in the case where the tag information is stored in the L1-cache 4 and the L2-cache per cache line, hence there is no need to provide a tag memory exclusively for the page mapping cache 6. In other words, according to the present embodiment, the tag information of the page mapping cache 6 having a large capacity and being accessible at a high speed can be stored in the known TLB 3.

Moreover, in the present embodiment, since access to the L1-cache 4 and the L2-cache 5 is made at a higher priority than access to the page mapping cache 6, it is possible to access the L1-cache 4 and the L2-cache 5. Furthermore, since data that cannot be stored any more in the L1-cache 4 and the L2-cache 5 is stored in the page mapping cache 6 having a large capacity and being accessible at a high speed, it is possible to perform data read and write at a higher speed than in the case of accessing the main memory 7.

Furthermore, in the present embodiment, since the TLB 3 stores the cache address information for the page mapping cache 6, when there are no hits in the L2-cache 5, by using the cache address information, desired data can be quickly read out from the page mapping cache 6.

Second Embodiment

In the second embodiment which will be described below, access to the L2-cache 5 and the page mapping cache 6 is made in parallel.

The present embodiment is effective, especially, when the page mapping cache 6 has access latency as low as the L2-cache 5 or the page mapping cache 6 has a memory capacity several to several ten times that of the L2-cache 5.

The page mapping cache 6 and the L2-cache 5 store data of different physical addresses. In other words, the page mapping cache 6 and the L2-cache 5 store data in a mutually exclusive manner.

The page mapping cache 6 of the present embodiment stores data to which access is frequently made over the entire page. By contrast, the L2-cache 5 stores data of a specific line in a page, when access is made frequently to the specific line.

As described above, in the present embodiment, whether data is stored into the page mapping cache 6 or the L2-cache 5 in one page is switched dynamically.

Figure 6:
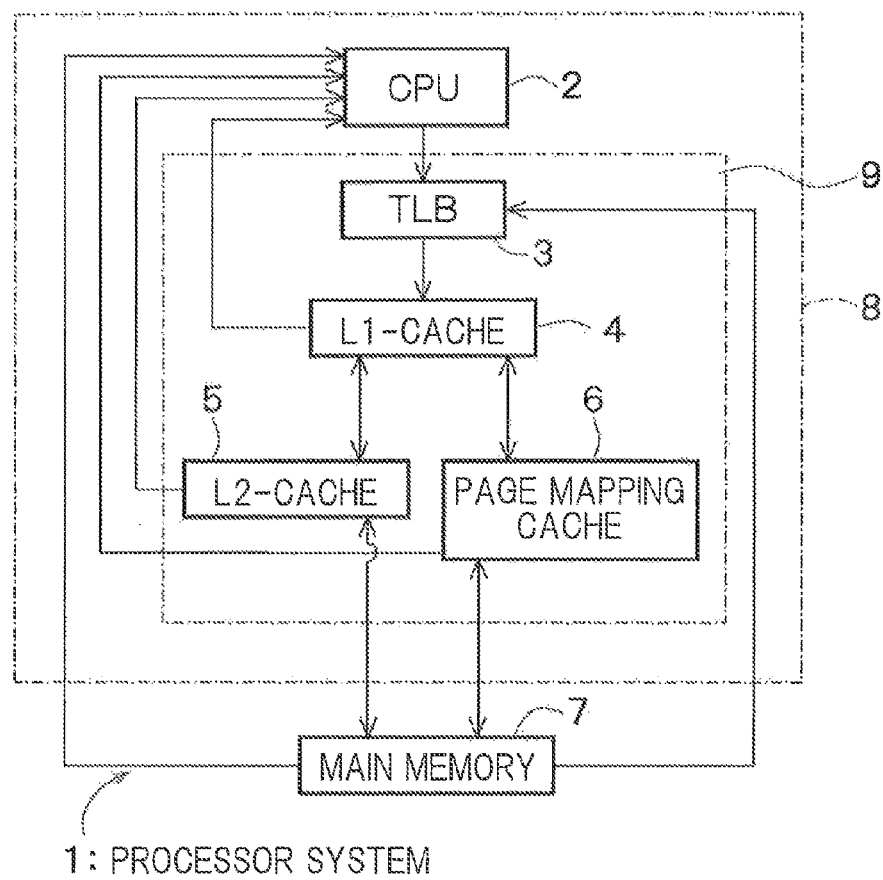
FIG. 6 is a block diagram showing schematic configuration of a processor system 1 according to a second embodiment.

FIG. 6 is a block diagram showing schematic configuration of a processor system 1 according to the second embodiment. The processor system 1 of FIG. 6 is different from that of FIG. 1 in that the CPU 2 accesses the L2-cache 5 and the page mapping cache 6 in parallel.

Figure 7:
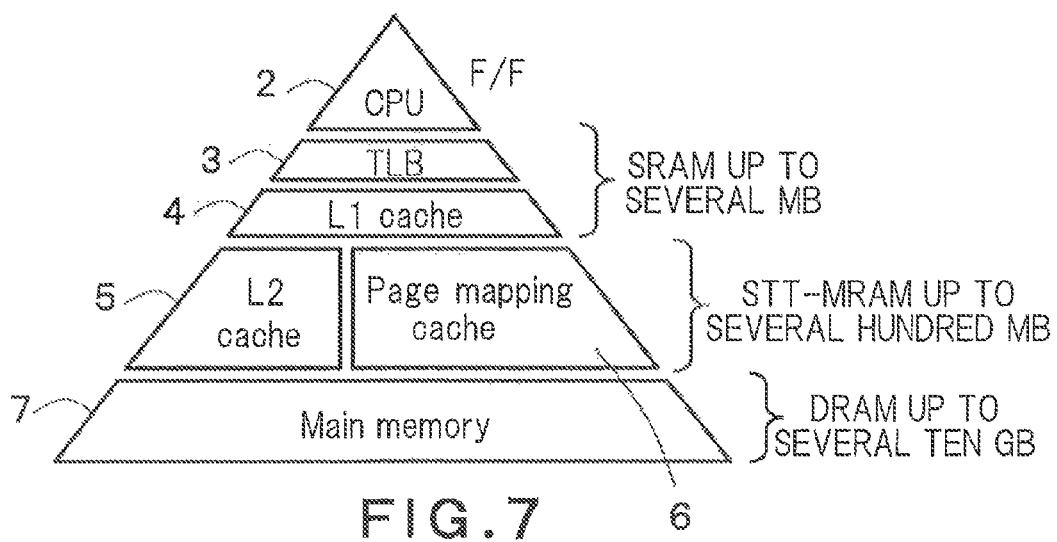
FIG. 7 is a diagram showing the access priority to the TLB 3, the cache memories 4 to 6, and the main memory 7, in the second embodiment.

FIG. 7 is a diagram showing the access priority to the TLB 3, the cache memories 4 to 6, and the main memory 7, in the second embodiment. As shown, the CPU 2 accesses the TLB 3, the L1-cache 4, the L2-cache 5 and the page mapping cache 6 in parallel, and the main memory 7, in this order.

Figure 8:
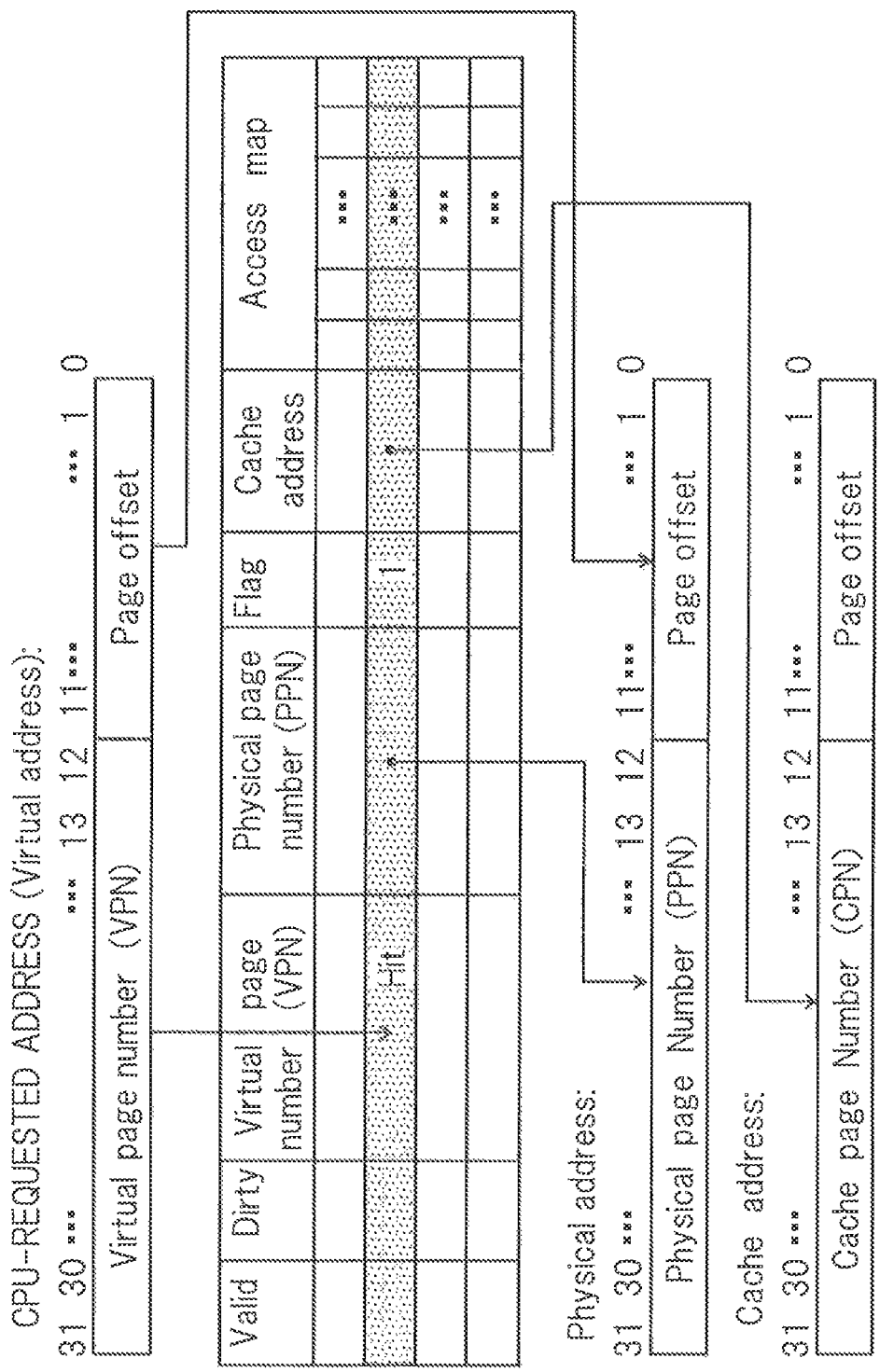
FIG. 8 is a diagram showing the internal configuration of the TLB 3 in the second embodiment.

FIG. 8 is a diagram showing the internal configuration of the TLB 3 in the second embodiment. In addition to the configuration of the TLB 3 of FIG. 3, the TLB 3 of FIG. 8 has an access map per page. The access map has bits of all lines in one page for every page, for example. When data is stored in the L2-cache 5, bits of the corresponding line are set to 1, for example. When the number of bits set to 1 exceeds a predetermined threshold value in all bits of one page in the access map, data for that page is stored in the page mapping cache 6, while the corresponding data in the L2-cache 5 is invalidated.

Although the TLB 3 of FIG. 8 has cache address information for accessing the page mapping cache 6, like the TLB 3 of FIG. 2, the cache address information is not necessarily essential. When there are many entries to the page mapping cache 6, the TLB 3 may be configured to be set associative. Moreover, when data is stored in the L2-cache 5, the cache address information is not necessary. By contrast, when data is stored in the page mapping cache 6, the access map is not necessary. Therefore, the same bits can be used for the access map and the cache address information in the TLB 3, thereby the capacity of the TLB 3 can be reduced.

Figure 9:
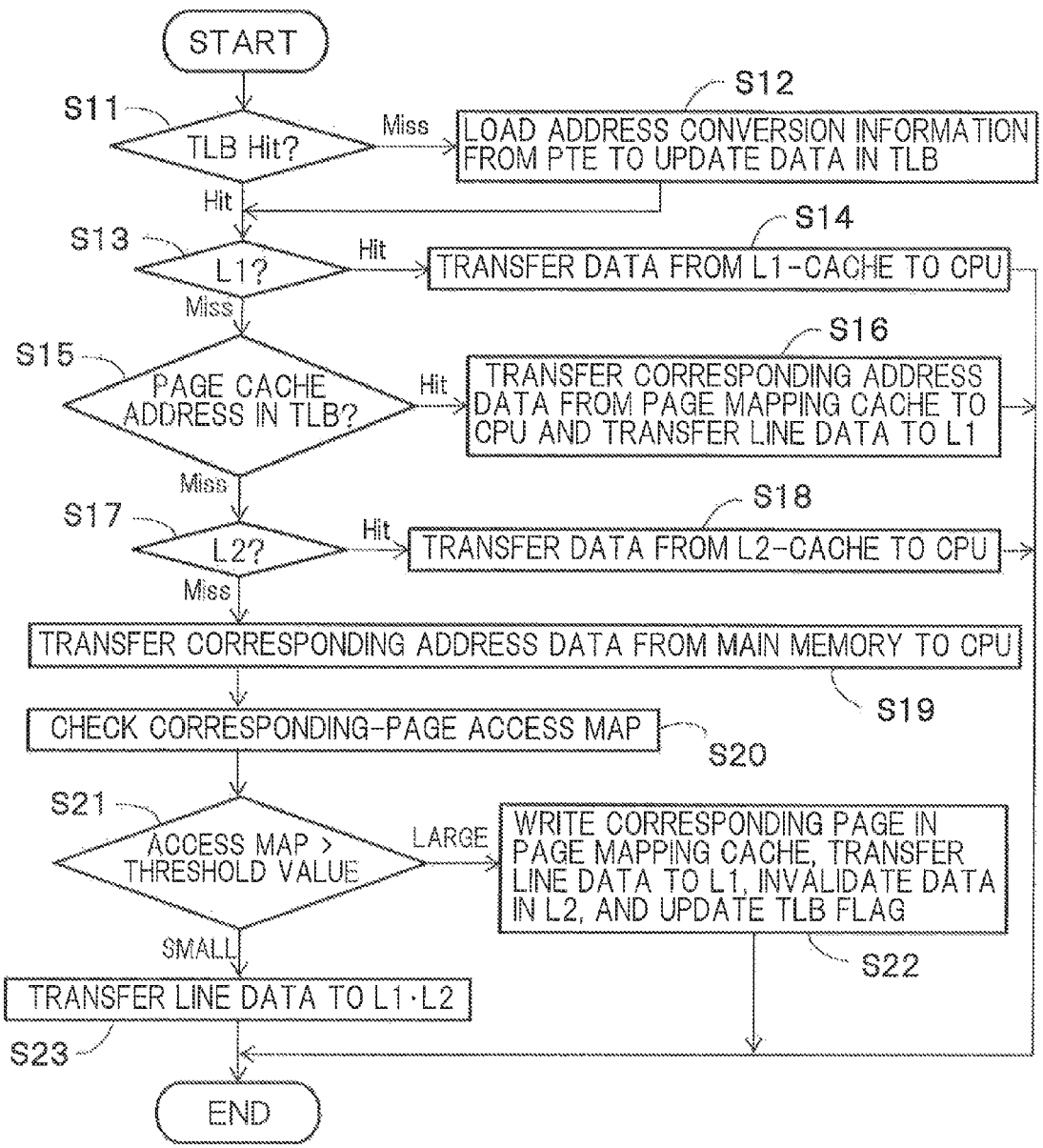
FIG. 9 is a flowchart showing a process in the case where the CPU 2 issues a read request address, according to the second embodiment.

FIG. 9 is a flowchart showing a process in the case where the CPU 2 issues a read request address, according to the second embodiment. Steps S11 to S14 are the same as steps S1 to S4 of FIG. 5. If it is determined in step S13 that there are no hits in the L1-cache 4, it is determined, based on the flag information held by the TLB 3, whether the data corresponding to the read request address is stored in the page mapping cache 6 (step S15). If stored, page data corresponding to the read request address is read out from the page mapping cache 6 and transferred to the CPU 2, and cache line data corresponding to this address is transferred to the L1-cache 4 (step S16). Steps S11 and S12 correspond to the first process. Steps S13 and S14 correspond to the second process. Steps S15 and S16 correspond to the third process.

If determined that no corresponding data is stored in step S15, it is determined whether the read request address issued by the CPU 2 has any hits in the tag information in the L2 cache 5 (step S17). If there is a hit, data stored in the L2-cache 5 is read out and transferred to the CPU 2 (step S18). Steps S17 and S18 correspond to the fourth process. Concerning step S15, since information required for step S15 is read out from the TLB 3 at a moment of accessing the TLB 3 in step S11, step S15 does not cause delay in the timing of accessing the L2-cache 5, compared to a memory system without the page mapping cache 6.

If determined that there are no hits in step S17, the data corresponding to the read request address issued by the CPU 2 is read out from the main memory 7 and transferred to the CPU 2, page data corresponding to the read request address is transferred to the page mapping cache 6, and cache line data corresponding to the read request address is transferred to the L1-cache 4 and the L2-cache 5 (step S19). Step S19 corresponds to a fifth process.

Subsequently, a check is made on the corresponding page of the access map in the TLB 3 (step S20). In detail, when data read out from the main memory 7 is written in the L2-cache 5 and the access map in the TLB 3 is updated, it is checked whether the number of bits of the corresponding page in the access map turned into 1 exceeds a threshold value (steps S20 and S21).

If determined that the number of bits exceeds the threshold value, data of all lines in the corresponding page are transferred from the L2-cache 5 and the main memory 7 to the page mapping cache 6, data of the L2-cache 5 in all lines in the corresponding page is invalidated, and the TLB 3 is updated. Data overflowing from the page mapping cache 6 is written back to the main memory 7 according to need. The data corresponding to the read request address issued by the CPU 2 is transferred to the L1-cache 4 (step S22). Steps S20 to S22 correspond to a sixth process.

If determined that the number of bits does not exceed the threshold value in step S20, the data corresponding to the read request address issued by the CPU 2 is transferred to the L1-cache 4 and the L2-cache 5 (step S23). Step S23 corresponds to a seventh process.

As described above, according to the second embodiment, since access to the L2-cache 5 and the page mapping cache 6 is made in parallel, it is possible to switch that data is stored into which of the L2-cache 5 or the page mapping cache 6, depending on whether access is frequently occurred over the entire corresponding page or whether access is focused on a specific line in the corresponding page. Therefore, the L2-cache 5 and the page mapping cache 6 can be used in an efficient manner.

Third Embodiment

In a third embodiment which will be described below, there is a page table in addition to the TLB 3. As the number of entries to the page mapping cache 6 increases, not all the address conversion information, flag information, etc. related to the entries may be stored in the TLB 3. In the present embodiment, information overflowing from the TLB 3 is stored in the page table.

Figure 10:
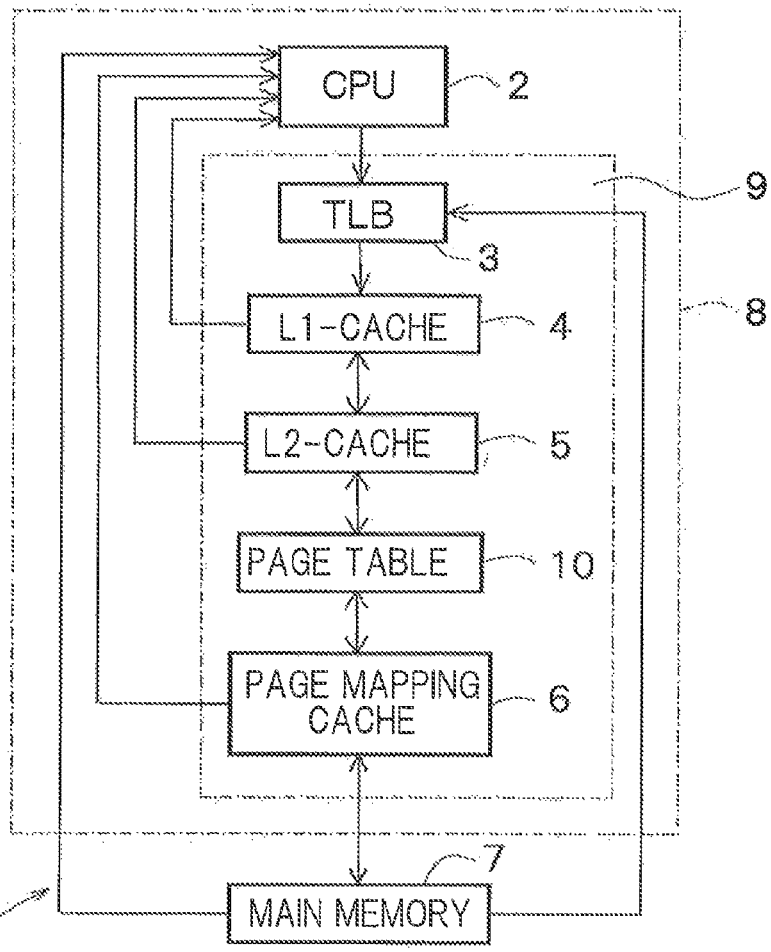
FIG. 10 is a diagram showing schematic configuration of a processor system 1 according to a third embodiment.

FIG. 10 is a diagram showing schematic configuration of a processor system 1 according to the third embodiment. Compared to FIG. 1, the processor system 1 of FIG. 10 is provided with a page table (second storage) 10 newly disposed between the L2-cache 5 and the page mapping cache 6. Address conversion information, flag information, etc. that overflow from the TLB 3 are stored in the page table 10. Therefore, the page table 10 basically has the same internal configuration as the TLB 3. Like the page mapping cache 6, the page table 10 includes a memory (such as an MRAM) accessible at a higher speed than the main memory 7.

Figure 11:
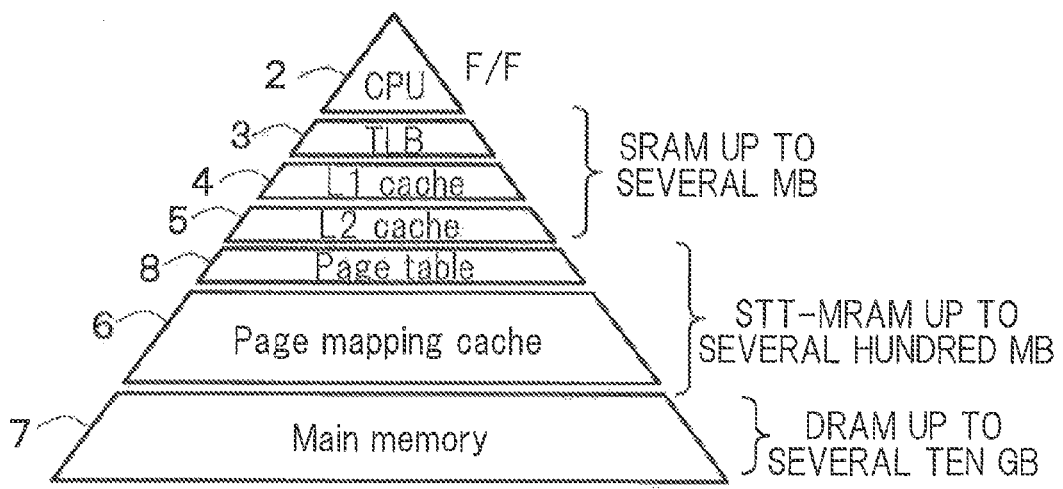
FIG. 11 is a diagram showing the access priority to the TLB 3, the page table 10, the cache memories 4 to 6, and the main memory 7, in the third embodiment.

FIG. 11 is a diagram showing the access priority to the TLB 3, the page table 10, the cache memories 4 to 6, and the main memory 7, in the third embodiment. As shown, the CPU 2 accesses the TLB 3, the L1-cache 4, the L2-cache 5, the page table 10, the page mapping cache 6, and the main memory 7, in this order.

In the case where a read request address of the CPU 2 does not have any hits in the TLB 3, the page table 10 is searched before access to the main memory 7, and if there is a hit in the page table 10, the address conversion Information can be loaded without access to the main memory 7. And, if there is no corresponding data in the L1-cache 4 and the L2-cache 5, the corresponding data is retrieved from the page mapping cache 6. With this mechanism, the frequency of accessing the main memory 7 can be reduced.

As described above, it is preferable that the page table 10 basically has the same internal configuration as the TLB 3 and stores the cache address information for directly accessing the page mapping cache 6. When there are many entries to the page mapping cache 6, the page table 10 is preferably configured to be set associative. Moreover, when the task executed by the CPU 2 is changed, in order to avoid invalidating and updating the entire page table 10, the address conversion Information and the like may be managed by providing an address space ID (ASID) for each task.

FIG. 12 is a flowchart showing a process in the case where the CPU 2 issues a read request address, according to the third embodiment. Steps S31 to S36 are the same as steps S1 to S6 of FIG. 5. Steps S31 and S32 correspond to the first process. Steps S33 to S36 correspond to the second process.

If it is determined in step S35 that there is a miss in the L2-cache 5, it is determined whether the read request address of the CPU 2 has any hits in the page table 10 (step S37). If determined that there is a hit, the corresponding data is read out from the page mapping cache 6 and transferred to the CPU 2, and cache line data corresponding to the read request address is transferred to the L1-cache 4 and the L2-cache 5 (step S38). Steps S37 and S38 correspond to the third process.

If it is determined in step S35 that there is a miss in step S37, the data corresponding to the read request address issued by the CPU 2 is read out from the main memory 7 and transferred to the CPU 2, page data corresponding to this address is transferred to the page mapping cache 6, cache line data corresponding to this address is transferred to the L1-cache 4 and the L2-cache 5, and the TLB 3 and the page table 10 are updated (step S39). Step S39 corresponds to the fourth process.

As described above, in the third embodiment, the page table 10 is provided in addition to the TLB 3. Therefore, even if the number of entries to the page mapping cache 6 increases so that address conversion information and the like overflow from the TLB 3, the overflowing information can be stored in the page table 10. Accordingly, the third embodiment is applicable even if capacity of the page mapping cache 6 increases.

Fourth Embodiment

In the first to third embodiments described above, the CPU 2 accesses the TLB 3, the cache memories 4 to 6, and the main memory 7, in this order. Thus, when the TLB 3 has a larger capacity, it takes time to search the TLB 3, and hence access to the L1-cache 4 cannot be done quickly. For this reason, in the following fourth embodiment, the CPU 2 accesses the L1-cache 4 before the TLB 3.

Figure 13:
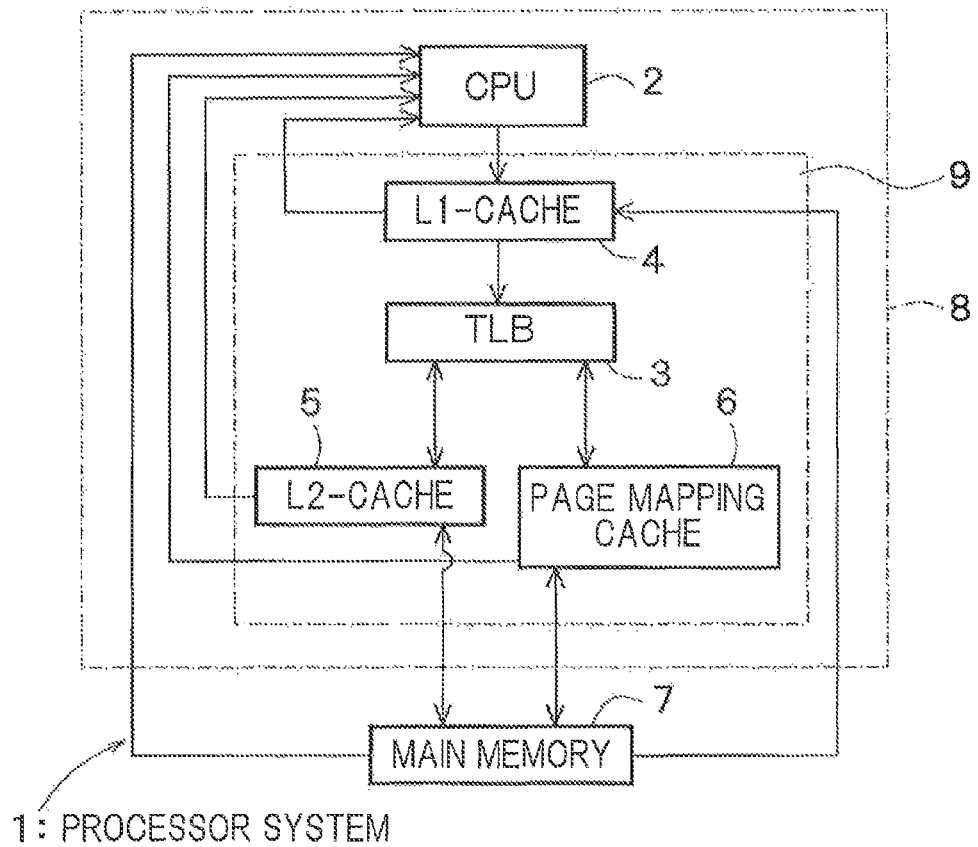
FIG. 13 is a block diagram showing schematic configuration of a processor system 1 according to a fourth embodiment.
Figure 14:
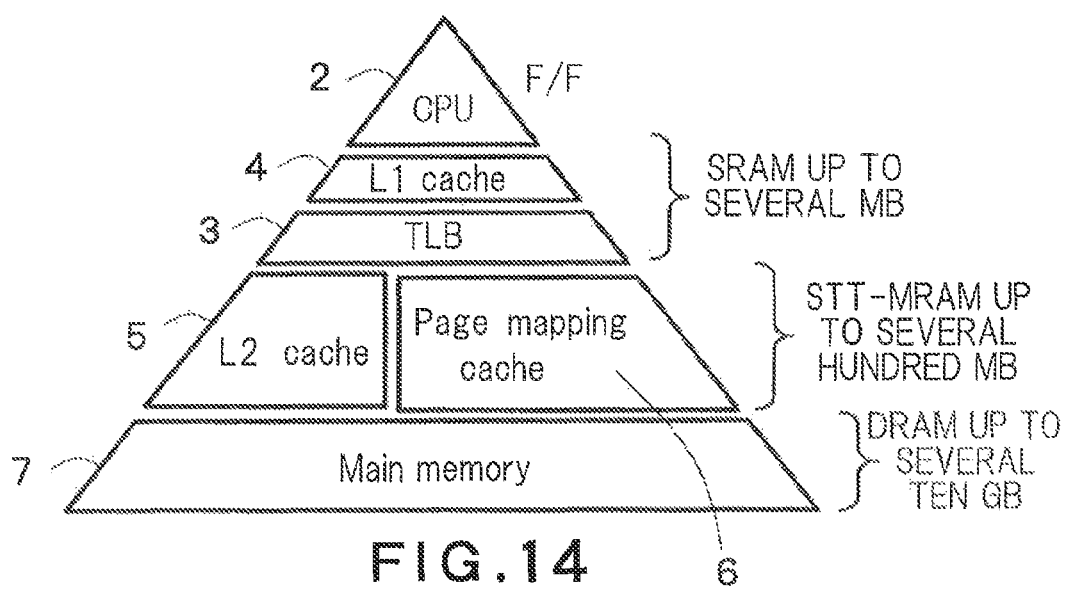
FIG. 14 is a diagram showing the access priority to the TLB 3, the cache memories 4 to 6, and the main memory 7, in the fourth embodiment.

FIG. 13 is a block diagram showing schematic configuration of a processor system 1 according to the fourth embodiment. FIG. 14 is a diagram showing the access priority to the TLB 3, the cache memories 4 to 6, and the main memory 7, in the fourth embodiment. In the present embodiment, compared with FIGS. 6 and 7, the L1-cache 4 and the TLB 3 are replaced with each other.

When the CPU 2 issues a read request address, the CPU 2 accesses the L1-cache 4 at first. The L1-cache 4 of FIG. 13 is directly accessible with a read request address that is a virtual address. When the CPU 2 has misses in the L1-cache 4, the CPU 2 accesses the TLB 3.

In the present embodiment, in the case where access is made to the L1-cache 4 with a virtual address, when the CPU 2 changes the task, the entire L1-cache 4 has to be invalidated (flushed). However, since data stored in the L1-cache 4 is stored in either the L2-cache 5 or the page mapping cache 6, there is almost no necessity to access the main memory 7, thereby the address space can be switched at a high speed.

Figure 15:
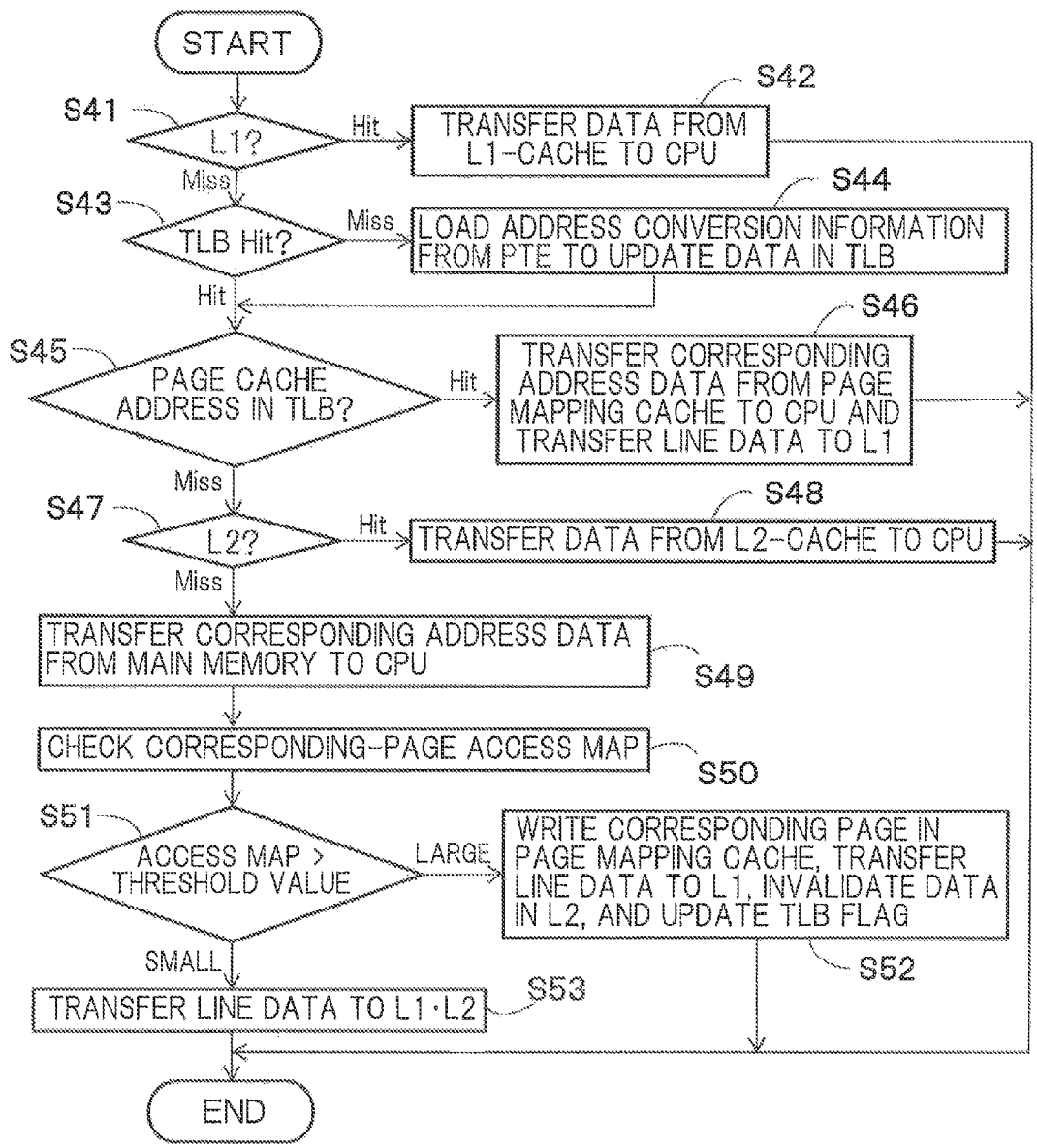
FIG. 15 is a flowchart showing a process in the case where the CPU 2 issues a read request address, according to the fourth embodiment.

FIG. 15 is a flowchart showing a process in the case where the CPU 2 issues a read request address, according to the fourth embodiment. In the flowchart of FIG. 15, compared with the flowchart of FIG. 9, the determination steps S11 and S13 are reversed. In detail, it is determined whether the read request address issued by the CPU 2 has any hits in the L1-cache 4 (step S41). If there is a hit, data read out from the L1-cache 4 is transferred to the CPU 2 (step S42). If there are no hits, it is determined whether the read request address issued by the CPU 2 has any hits in the TLB 3 (step S43). If there are no hits, the address conversion Information is loaded from the page table entry in the main memory 7 to update data in the TLB 3 (step S44). Steps S41 and S42 correspond to the first process. Steps S43 and S44 correspond to the second process.

If determined that data is stored in step S43 or if step S44 is complete, it is determined, based on the flag information held by the TLB 3, whether the data corresponding to the read request address issued by the CPU 2 is stored in the page mapping cache 6 (step S45), followed by the same steps as step S17 and the subsequent steps of FIG. 9 (steps S46 to S53). Steps S45 and S46 correspond to the fourth process. Steps S47 and S48 correspond to the fourth process. Step S49 corresponds to the fifth process. Steps S50 and S52 correspond to the sixth process. Step S53 corresponds to the seventh process.

Even in the present embodiment, the TLB 3 may be provided with address space ID (ASID) to manage address conversion information and the like for each task.

FIG. 13 shows an example in which the L2-cache 5 and the page mapping cache 6 are arranged to be accessed in parallel. By contrast, in FIGS. 1 and 10, when the L2-cache 5 and the page mapping cache 6 are arranged not to be accessed in parallel, the access order to the L1 cache 4 and the TLB 3 may be reversed.

As described above, in the fourth embodiment, the L1-cache 4 is accessed before the TLB 3 so that the L1-cache 4 can be accessed quickly even if the TLB 3 has a large capacity and it takes much access time to access the TLB 3.

The access order may be changed so that, not only the L1-cache 4, but also the L2-cache 5 is accessed before the TLB 3.

In the embodiments described above, the L1-cache 4 and the L2-cache 5 are arranged as a dual-layer memory, however, the L1-cache 4 and the L2-cache 5 may be arranged as a tri-layer or more multi-layer cache memory. It is supposed that cache memories up to the k(k=1 to n that is an integer of 1 or more)-th-level cache memory are provided. In the process of FIG. 5, the page mapping cache 6 is accessed when there is a miss in every cache memory. In the process of FIG. 9, step S19 and the subsequent steps are executed when there is a miss in step S15 and then there is a miss in the L2-cache 5 and also in every high-level cache memory having a lower access priority than the L2-cache 5. In the process of FIG. 12, step S37 is executed when there is a miss in every cache memory. In the process of FIG. 15, step S49 and the subsequent steps are executed when there is a miss in step S45 and then there is a miss in the L2-cache 5 and also in every high-level cache memory having a lower access priority than the L2-cache 5.

In the embodiments described above, the memory cells of the L2-cache 5 are MRAM cells. However, the memory cells of the L2-cache 5 may be other non-volatile memories (such as, an ReRAM memory cell, a Phase change RAM (PRAM, PCM, etc.) memory cell, and a NAND flash memory cell). In each embodiment described above, part of or the entire memory control circuit 1 may be embedded in the L1-cache 4 or the L2-cache 5. Moreover, in each embodiment described above, in the case of cutting off power to a specific memory, power may simultaneously cut off part of or all of the memories to which power can be cut off among the cache memories up to the n-th-level (n being an Integer of 2 or more) cache memory and the main memory 7, except for the specific memory. Furthermore, in the case of cutting off power to a specific memory, the power-cut-off timing may be controlled for each non-volatile memory in the cache memories up to the n-th-level cache memory including the specific memory.

At least part of the processor system 1 explained in the embodiments described above may be configured with hardware or software. When it is configured with software, a program that performs at least part of the functions of the processor system 1 may be stored in a storage medium such as a flexible disk and CD-ROM, and then installed in a computer to run thereon. The storage medium may not be limited to a detachable one such as a magnetic disk and an optical disk but may be a standalone type such as a hard disk drive and a memory.

Moreover, a program that achieves the function of at least part of the processor system 1 may be distributed via a communication network (including wireless communication) such as the Internet. The program may also be distributed via an online network such as the Internet or a wireless network, or stored in a storage medium and distributed under the condition that the program is encrypted, modulated or compressed.

The embodiment of the present invention is not limited to the respective embodiments described above but includes a variety of modifications conceivable by parsons skilled in the art. The advantages of the present invention are also not limited to those explained above. Accordingly, various addition, changes, and partial omissions may be made without departing from the scope and spirit of the inventions derived from the accompanying claims and their equivalents.

The invention claimed is:

1. A cache memory system comprising:
   a first cache memory comprising one or more levels, to store data corresponding to addresses;
   a second cache memory comprising a plurality of non-volatile memory cells, which has higher speed capability than a main memory, has a larger capacity than the first cache memory and stores data corresponding to addresses; and
   a first storage to store address conversion Information from a virtual address issued by a processor to a physical address and to store flag information indicating whether data is stored in the second cache memory by a page having a larger data amount than a cache line, the first cache memory being accessed by the cache line.

2. The system of claim 1, wherein the first storage is accessed by the processor prior to the first cache memory.

3. The system of claim 2, wherein the first cache memory is accessed by the processor at a higher priority than the second cache memory.

4. The system of claim 1, wherein the second cache memory stores all data stored in the first cache memory.

5. The system of claim 1, wherein the first cache memory comprises cache memories of multiple levels, each cache memory having different access priority; and the first storage is accessed following a first-level cache memory in the first cache memory.

6. The system of claim 5, wherein the second cache memory stores all the data stored in the cache memory of all the levels except for the first-level cache memory in the first cache memory.

7. The system of claim 1, wherein the first cache memory comprises cache memories of multiple levels, each cache memory having different access priority, the cache memories of multiple levels comprises a first-level cache memory and a second-level cache memory having a lower access priority than the first-level cache memory in the first cache memory, the second-level cache memory being accessed in parallel with the second cache memory by a processor; and the second-level cache memory and the second cache memory store data corresponding to addresses different from each other.

8. The system of claim 7, wherein the first storage comprises an access map to include information that indicates whether data is stored in the second-level cache memory, by the cache line in the page.

9. The system of claim 1, wherein the first storage stores address information accessing the second cache memory, by the page.

10. The system of claim 1, wherein the first storage stores dirty information that indicates whether data in the second cache memory has been written back to the main memory, by the page.

11. The system of claim 1, wherein the first storage has a set associative configuration using partial bits of a virtual address as an index.

12. The system of claim 1 further comprising a second storage that stores address conversion information and flag information overflown from the first storage, the second storage being accessible at higher speed than the main memory.

13. The system of claim 12, wherein the second storage is accessed by the processor after the first cache memory is accessed, and the second cache memory is accessed by the processor after the second storage is accessed.

14. A processor system comprising:
a processor;
a main memory;
a first cache memory comprising one or more levels, to store data corresponding to addresses;
a second cache memory comprising a plurality of non-volatile memory cells, which has higher speed capability than a main memory, has a larger capacity than the first cache memory and stores data corresponding to addresses; and
a first storage to store address conversion Information from a virtual address issued by a processor to a physical address and to store flag information indicating whether data is stored in the second cache memory by a page having a larger data amount than a cache line, the first cache memory being accessed by the cache line.

15. The system of claim 14, wherein the processor executes:

a first process of determining whether a read request address hits the first storage and, if not hit, loading address conversion Information on the read request address from the main memory to update the first storage;

a second process of, after the first process, searching the first cache memory in ascending order sequentially from a lower-level cache memory to determine whether data corresponding to the read request address is stored in the first cache memory, and, if the data is stored, reading the stored data;

a third process of, if the data corresponding to the read request address is not stored in any cache memory of the first cache memory, determining, based on the flag information held by the first storage, whether the data corresponding to the read request address is stored in the second cache memory, and, if the data is stored in the second cache memory, reading the data corresponding to the read request address from the second cache memory, and storing cache line data corresponding to the read request address in the first cache memory; and a fourth process of, if not hit in the third process, reading the data corresponding to the read request address from the main memory, storing page data corresponding to the read request address in the second cache memory, storing cache line data corresponding to the read request address in the first cache memory, and updating the first storage based on the read request address.

16. The system of claim 14, wherein first cache memory comprises cache memories of multiple levels, each cache memory having different access priority, the cache memories of multiple levels comprises a first-level cache memory and a second-level cache memory having a lower access priority than the first-level cache memory in the first cache memory, the second-level cache memory being accessed in parallel with the second cache memory by a processor; and the first storage comprises an access map which stores information that indicates whether data is stored in the second-level cache memory, by the cache line in the page, the processor executes:

a first process of determining whether a read request address hits the first storage and, if not hit, loading address conversion information on the read request address from the main memory to update the first storage;

a second process of, after the first process, searching the first-level cache memory in the first cache memory to determine whether data corresponding to the read request address is stored in the first-level cache memory, and, if the data is stored, reading the stored data;

a third process of, if determined in the second process that the data corresponding to the read request address is not stored in the first-level cache memory, determining, based on the flag information held by the first storage, whether the data corresponding to the read request address is stored in the second cache memory, and, if the data is stored in the second cache memory, reading the data corresponding to the read request address from the second cache memory, and storing cache line data corresponding to the read request address in the first-level cache memory; and a fourth process of, if determined in the third process that the data corresponding to the read request address is not stored in the second cache memory, determining sequentially whether the read request address hits in high-level cache memories having a lower access priority than a first-level cache memory in the first cache memory, and, if hits, reading the data corresponding to the read request address from the hit cache memory;

a fifth process of, if determined in the fourth process that the data corresponding to the read request address is not stored in the second-level or higher-level cache memories, reading the data corresponding to the read request address from the main memory;

a sixth process of referring to a page corresponding to the read request address in the access map in the first storage, and if the number of data stored in the second-level cache memory exceeds a predetermined threshold value, storing all data of the corresponding page in the second cache memory to invalidate data in the second-level cache memory, reading cache line data corresponding to the read request address from the main memory, storing the cache line data in the first cache memory, and updating the first storage; and a seventh process of, if determined in the sixth process that the number of data stored in the second-level cache memory does not exceed a predetermined threshold value, reading cache line data corresponding to the read request address from the main memory and storing the cache line data in the second-level cache memory.

17. The system of claim 14, wherein the first cache memory comprises cache memories of multiple levels, each cache memory having different access priority, the system further comprising a second storage that stores address conversion Information and flag information overflown from the first storage, the second storage being accessible at a higher speed than the main memory, wherein the processor executes:

a first process of determining whether a read request address hits in the first storage and, if not hit, loading address conversion information on the read request address from the main memory to update the first storage;

a second process of, after the first process, searching the first cache memory in ascending order sequentially from a lower-level cache memory to determine whether data corresponding to the read request address is stored in the first cache memory, and, if the data is stored, reading the stored data;

a third process of, if the data corresponding to the read request address is not stored in the first cache memory, determining whether the read request address hits in the second storage, if hits, reading the data corresponding to the read request address from the second cache memory and storing cache line data corresponding to the read request address in the first cache memory; and a fourth process of, if not hit in the third process, reading the data corresponding to the read request address from the main memory, storing page data corresponding to the read request address in the second cache memory, storing cache line data corresponding to the read request address in the first cache memory, and updating the first storage and the second storage based on the read request address.

18. The system of claim 14, wherein the first cache memory comprises cache memories of multiple levels, each cache memory having different access priority, the cache memories of multiple levels comprises a first-level cache memory and a second-level cache memory having a lower access priority than a first-level cache memory in the first cache memory, the second-level cache memory being accessed in parallel with the second cache memory by a processor, and the first storage comprises an access map which stores information that indicates whether data is stored in the second-level cache memory, by the cache line in the page, the processor executes:

a first process of searching the a first-level cache memory in the first cache memory to determine whether data corresponding to the read request address is stored in the first-level cache memory, and, if the data is stored, reading the stored data;

a second process of, if the data corresponding to the read request address is not stored in the first-level cache memory, determining whether the read request address hits in the first storage, and, if not hit, loading address conversion information on the read request address from the main memory, to update the first storage, a third process of, after the second process, determining, based on the flag information held by the first storage, whether the data corresponding to the read request address is stored in the second cache memory, and, if the data is stored in the second cache memory, reading the data corresponding to the read request address from the second cache memory, and storing cache line data corresponding to the read request address in the first cache memory;

a fourth process of, if determined in the third process that the data corresponding to the read request address is not stored in the second cache memory, determining sequentially whether the read request address hits in high-level cache memories having a lower access priority than a first-level cache memory in the first cache memory, and, if hits, reading the data corresponding to the read request address from the hit cache memory;

a fifth process of, if determined in the fourth process that the data is not stored in the high-level cache memories, reading the data corresponding to the read request address from the main memory;

a sixth process of referring to a page corresponding to the read request address in the access map in the first storage, and if the number of data stored in the second-level cache memory exceeds a predetermined threshold value, storing all data of the corresponding page in the second cache memory to invalidate data in the second-level cache memory, storing cache line data corresponding to the read request address in the first cache memory, and updating the first storage; and a seventh process of, if determined in the sixth process that the number of data stored in the second-level cache memory does not exceed the predetermined threshold value, storing cache line data corresponding to the read request address in the first cache memory.

\* \* \* \* \*